Aug. 7, 1934.   S. M. CORBETT ET AL   1,968,816
METER FOR QUANTITATIVELY DETERMINING THE AMOUNT OF FOREIGN MATTER IN AIR
Filed July 18, 1930
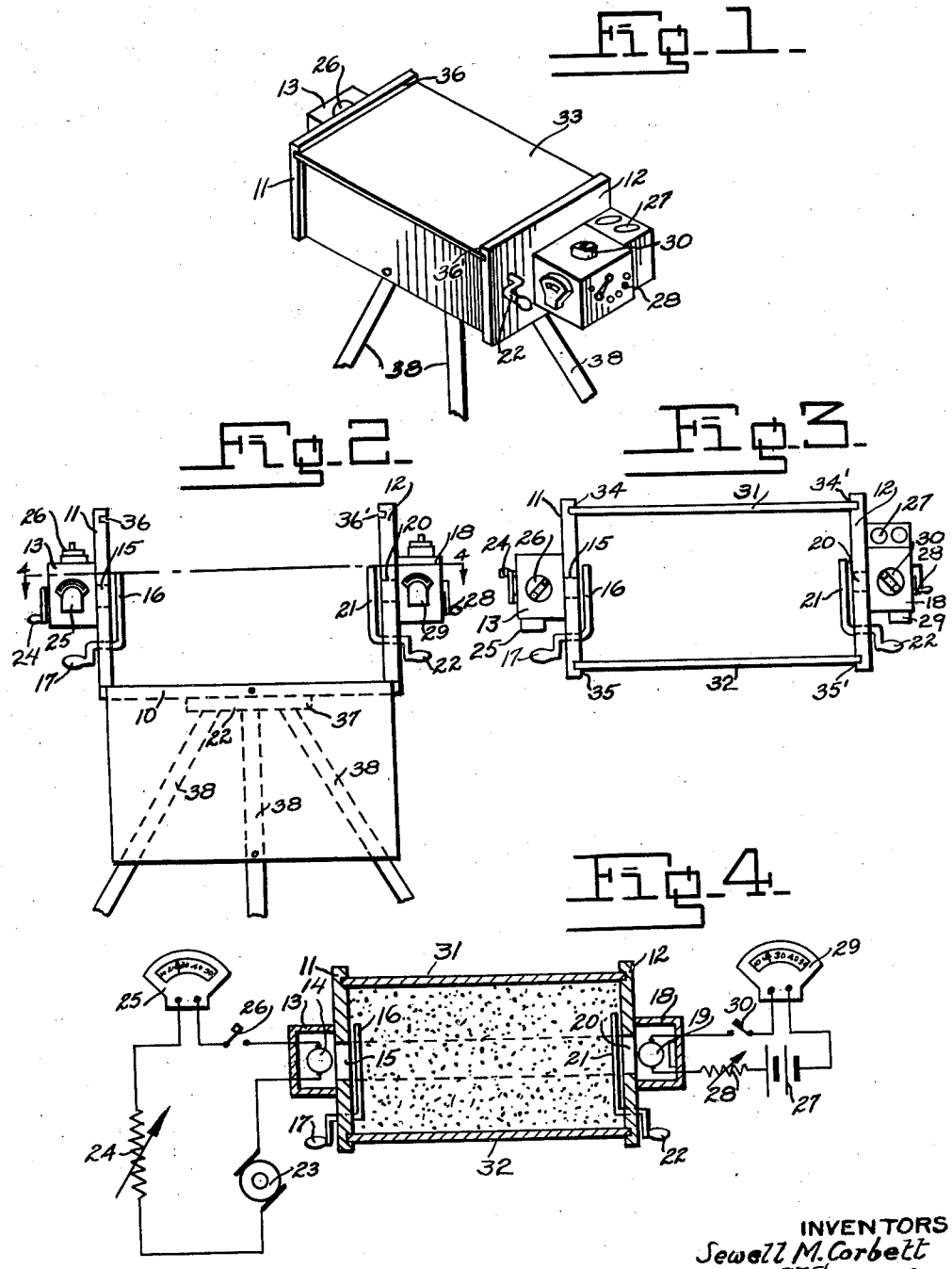
INVENTORS
Sewell M. Corbett
and
Leland H. Stanford
BY
ATTORNEY Patented Aug. 7, 1934

1,968,816

UNITED STATES PATENT OFFICE 1,968,816

METER FOR QUANTITATIVELY DETERMINING THE AMOUNT OF FOREIGN MATTER IN AIR

Sewell M. Corbett, United States Army, and Leland H. Stanford, United States Army, Fort Sam Houston, Tex.

Application July 18, 1930, Serial No. 468,914

2 Claims. (Cl. 88—14)

(Granted under the act of March 3, 1883, as amended April 30, 1928; 370 O. G. 757)

This invention described herein may be manufactured and used by or for the Government for governmental purposes, without the payment to us of any royalty thereon.

Our invention relates to a device for measuring the amount, or relative proportion of impurities in air.

Primarily, the device set forth by this invention consists in an apparatus with which it is possible to obtain an accurate estimation of the amount of foreign matter, whether solid, liquid or gaseous, contained in one or more given volumes of air which may be taken from any desired locality.

One object of the invention is to provide a device of the nature set forth, which will be portable, so as to make it possible to easily procure a sample of a given volume of air at various places and to thus provide a number of readings from which a mean result may be obtained and thus estimate the general condition of the air, in a certain locality, with respect to its content of foreign matter.

Another object of the invention is to provide a device of the type set forth with which samples of air may be secured in a condition of minimum disturbance, or while the air is at rest.

Another object is to provide a simple, compact, portable instrument of economical construction, which may be easily operated and whereby accurate measurements of the dust or visible gas content of air in a given locality, may be ascertained by reading a scale which indicates the relative translucence of a sample or samples as compared with a standard.

A still further object is to provide an accurate measuring instrument for indicating the amount of dust or visible foreign matter contained in a given volume of air directly on a suitable scale which is calibrated by reference to the translucence of a sample of air of known constituency.

Briefly stated, the instrument is so constructed that it is possible to secure with it a sample of air, which it is desired to test in a undisturbed condition, and to measure the relative content of the visible foreign matter therein by reading a meter which is preferably attached to the instrument. The measurement is accomplished by passing a light of known intensity through a given volume of the air and allowing it to act upon a photo-electric cell, or other light sensitive apparatus, which is placed in a circuit containing a suitable meter which indirectly indicates the translucency of the sample and which by comparison with known measurements gives the relative proportion of visible foreign matter to air contained therein.

The photo-electric cell is based on the principle of the liberation of electrons by radiant energy. The characteristic of this cell is such that when it is polarized by the proper voltage and is used within proper limits, the current through it is proportional to the incident light. If the polarizing voltage is supplied to the cell through a very high resistance there is obtained across this resistance a voltage which is proportional to the light falling upon the cell and bears a direct relation to the degree of translucence of the air through which the light passes in its path to the cell.

The apparatus set forth by this invention is of practical value in determining the condition of air in hospitals, public halls, theatres, etc., where it is always necessary to keep the air in a purified condition. The apparatus may also be used to great advantage in checking the results of air conditioning plants which are installed in such places.

Formerly aerological meters have been used which only showed a condition of the air by the amount of its translucence and no attempt has been made so far, as shown by an investigation of the art, to measure the actual amount of foreign matter contained in a unit volume of air as is accomplished by the instrument set forth by this invention. This instrument actually measures the amount of visible foreign matter contained in a unit volume of air which may be taken from any number of places, say each room of a house, to determine the average amount of such foreign matter contained in the air throughout the whole building.

This invention consists in certain novel features of construction, combination and arrangement of parts, which will be hereinafter set forth in the accompanying specification and drawing and pointed out in the claims.

In the drawing, in which similar parts are represented by like numerals:

Fig. 1 shows a perspective view of the instrument with sides and top closed, and mounted upon a tripod;

Fig. 2 shows a side elevation of the instrument with its sides open and the top removed, prior to making a measurement;

Fig. 3 is a plan view of the instrument with top removed, and

Fig. 4 is a sectional view along the lines 4—4 of Fig. 2 and a diagrammatic view showing the various parts throughout the circuits connected with the instrument to more clearly illustrate the principles of operation in the same.

Referring to the drawing the numeral 10 represents a baseboard support on either end of which are attached the panels 11 and 12. To the end panel 11 is fixed the container 13, which forms a support for a light source 14, arranged to shine through an aperture 15 in the end panel 11. The opening 15 may be closed by a shutter 16, controlled by a crank 17 to exclude dust from the light source 14 prior to operation of the instrument. On the end panel 12 is attached a container 18 within which is mounted a photo-electric cell 19 which receives light through an opening 20, which may be closed by a shutter 21, operated by a crank 22.

The light source 14 is located in a circuit containing a source of power 23, a rheostat 24, a meter 25 and a switch 26, as shown diagrammatically in Fig. 4. The photo-electric cell 19 is located in a circuit containing a source of power 27, a rheostat 28, a meter 29, and a switch 30.

For convenience of operation the meters 25 and 29, the rheostats 24 and 28, the sources of power 23 and 27 and switches 26 and 30 may all be attached to the containers 13 and 18 as shown in the drawing.

Sides 31 and 32 are arranged to be placed between end panels 11 and 12 and in conjunction with a top 33, which is detachably mounted on said end panels and form a compartment for confining the air to be tested.

In the construction shown the sides 31 and 32 and the top 33 are all slidably mounted within the grooves 34, 34'; 35, 35' and 36, 36' in the end panels 11 and 12. Slidable mountings are preferred in an apparatus of this kind because with this type of construction the central compartment may be closed with very little agitation, or disturbance of any kind to the air enclosed therein.

The entire apparatus, including the central compartment, the containers for the light source and photo-electric cell, the battery, switches, rheostats and meters, may all be built into a single unit as shown in the illustrations and mounted on a tripod 37 having legs 38, or on any other suitable support, or the unit may be suspended.

As shown in Fig. 4, the light source 14 is operated from a source of energy 23 when the switch 21, in the circuit, is closed. The desired intensity of the light is maintained by a rheostat 24 or any other suitable adjusting device, which is set in accordance with the reading on the meter 25.

The photo-electric cell 19 is placed in a separate circuit which receives its energy from a battery 27. The energy of this circuit is controlled by the rheostat 28 and is measured by the meter 29.

The principle of operation is that the instrument measures the impediment to light rays through volume of air inclosed between the ends 11 and 12, the bottom 10, top 33 and side walls 31 and 32 of the central container, as shown in the illustrations. This impediment which effects the translucence of the air is due to dust, moisture and visible gas.

The photo-electric cell as set forth in this invention is a light sensitive means for measuring the translucency of dust laden air, however, it is to be understood that the construction set forth by the invention is not to be restricted to the use of this type of light sensitive apparatus; as either a photo-conduction, a photo-chemical or thermo-electric light sensitive apparatus may also be used in lieu thereof. Neither is the manner of hook-up, as shown in Fig. 4, to be strictly adhered to, since suitable resistances and capacities may be introduced into the circuits to facilitate their operation and if necessary one or more radio amplifying units may be placed in the circuit of the photo-electric cell to intensify its activity.

The instrument, in manufacture, may be calibrated for light, strength and pick-up, in air with different known humidity and known degree of solid and gaseous air borne impurities. In use its accuracy of calibration can be checked by references to samples of known degree of impurity.

The manner of operation is to connect the energy source and the meters, adjust the light strength and voltage of the photo-electric cell to a desired limit, open the device as shown in Fig. 2, and allow to remain open a sufficient length of time for air conditions around it to become normal, then the sides 31 and 32 are lifted and the lid 33 is slipped into place. The shutters 16 and 21 are then opened by cranks 17 and 22 and a reading of the meter 29 is taken. This reading when compared with the calibrated readings will give the relative translucency of the sample of air and indicate the impurity content of the air from which the sample was secured.

The above description sets forth the general construction of the device upon which this invention is based. However, various slight changes might be made in the details of construction of our invention without departing from its scope, and hence we do not wish to limit ourselves to the precise detail herein set forth.

Having described our invention, what we claim as new and wish to secure by Letters Patent is—

1. A portable device for measuring the content of foreign matter in air comprising in combination a central container, said container consisting of a base, end pieces attached to said base, said end pieces provided with grooves parallel to and adjacent their top and side edges, and a top and sides slidably mounted within the grooves and adapted to entrap within said central container a given volume of air in an undisturbed condition; end compartments projecting from the exterior surfaces of said end pieces, and communicating with the central container, a light source located within one of said projecting compartments, and a photo-electric cell located within the opposite compartment, in the path of light radiated from said light source, and traversing the central compartment; means for maintaining a constant intensity of said light source, and an indicating apparatus operatively connected to the photo-electric cell to determine the translucency of air entrapped within the central container.

2. A portable device for measuring the content of foreign matter in air comprising in combination a central container, said container consisting of a base, end pieces attached to said base, said end pieces provided with grooves parallel to and adjacent their top and side edges, and a top and sides slidably mounted within the grooves and adapted to entrap within said central container a given volume of air in an undisturbed condition; end compartments projecting from the exterior surfaces of said end pieces, and communicating through shuttered openings with the central container, a light source located within one of said projecting compartments and a photo-electric cell located within the opposite compartment, in the path of light radiated from said light source, and traversing the central compartment; means for maintaining a constant intensity of said light source, an indicating apparatus operatively connected to the photo-electric cell to determine the translucency of air entrapped within the intervening central container.

SEWELL M. CORBETT.
LELAND H. STANFORD.